(12) United States Patent
Zhou et al.

(10) Patent No.: US 12,328,733 B2
(45) Date of Patent: Jun. 10, 2025

(54) CROSS-CARRIER REFERENCE SIGNAL SCHEDULING OFFSET AND THRESHOLD DETERMINATION

(71) Applicant: QUALCOMM Incorporated, San Diego, CA (US)

(72) Inventors: Yan Zhou, San Diego, CA (US); Makesh Pravin John Wilson, San Diego, CA (US); Tao Luo, San Diego, CA (US); Tianyang Bai, Somerville, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 17/115,499

(22) Filed: Dec. 8, 2020

(65) Prior Publication Data

US 2021/0092721 A1    Mar. 25, 2021

Related U.S. Application Data

(63) Continuation of application No. 16/146,628, filed on Sep. 28, 2018, now Pat. No. 10,897,754.

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0048* (2013.01); *H04W 56/005* (2013.01);
(Continued)

(58) Field of Classification Search
None
See application file for complete search history.

(56) References Cited

U.S. PATENT DOCUMENTS

2015/0208392 A1    7/2015    Park et al.
2018/0131482 A1    5/2018    Zhou et al.
(Continued)

FOREIGN PATENT DOCUMENTS

CN    106714322 A    5/2017
EP    3518601 A2    7/2019
(Continued)

OTHER PUBLICATIONS

"3rd Generation Partnership Project; Technical Specification Group Radio Access Network; NR; Physical layer procedures for Data (Release 15)", 3GPP Standard, Technical Specification, 3GPP TS 38.214, 3rd Generation Partnership Project (3GPP), Mobile Competence Centre, 650, Route Des Lucioles, F-06921 Sophia-Antipolis Cedex, France, vol. RAN WG1, No. V15.2.0, Jun. 29, 2018, XP051474491, pp. 1-95, [retrieved on Jun. 29, 2018], section 1 "Scope", section 5 .1. 2 .1 "Resource allocation in time domain" section 5 .1.2 .2 "Resource allocation in frequency domain" section 5.1.5 "Antenna ports quasi co-location", section 6.1.4, section 6.1.4.1, tables 6.1.4.1-1, 6.1.4.1-2.
(Continued)

*Primary Examiner* — Adnan Baig
(74) *Attorney, Agent, or Firm* — Paul M. McAdams; Harrity & Harrity, LLP

(57) ABSTRACT

Various aspects of the present disclosure generally relate to wireless communication. In some aspects, a user equipment (UE) may receive, via a first carrier, an indication of an offset for scheduling a reference signal on a second carrier, wherein the offset indicates a duration between downlink control information (DCI), that schedules the reference signal, and the reference signal; determine a first numerology of the first carrier and a second numerology of the second carrier; and determine a time offset for the reference signal based at least in part on the offset and at least one of
(Continued)

the first numerology, the second numerology, or both the first numerology and the second numerology. Numerous other aspects are provided.

53 Claims, 8 Drawing Sheets

(51) Int. Cl.
    H04W 56/00    (2009.01)
    H04W 72/0446    (2023.01)
    H04W 72/0453    (2023.01)
    H04W 72/21    (2023.01)
    H04B 7/0413    (2017.01)

(52) U.S. Cl.
    CPC ... *H04W 72/0446* (2013.01); *H04W 72/0453* (2013.01); *H04W 72/21* (2023.01); *H04B 7/0413* (2013.01)

(56) References Cited

U.S. PATENT DOCUMENTS

| | | | |
|---|---|---|---|
| 2018/0152964 | A1 | 5/2018 | Sun et al. |
| 2019/0052331 | A1* | 2/2019 | Chang ............... H04B 7/08 |
| 2020/0077432 | A1 | 3/2020 | Xiong et al. |
| 2020/0107299 | A1 | 4/2020 | Zhou et al. |
| 2020/0128578 | A1* | 4/2020 | Park ............ H04W 72/1289 |
| 2020/0178350 | A1* | 6/2020 | Miao ............... H04L 5/0055 |
| 2020/0374730 | A1* | 11/2020 | Gao ................ H04L 5/0057 |
| 2021/0076324 | A1* | 3/2021 | Kaikkonen ......... H04B 7/0617 |
| 2022/0039129 | A1* | 2/2022 | Takeda ............. H04W 72/046 |

FOREIGN PATENT DOCUMENTS

| | | |
|---|---|---|
| KR | 20180046358 A | 5/2018 |
| WO | 2018010102 A1 | 1/2018 |
| WO | 2018062840 A1 | 4/2018 |
| WO | 2018127833 A1 | 7/2018 |
| WO | 2018175820 A1 | 9/2018 |

OTHER PUBLICATIONS

Ericsson: "Feature Lead Summary 3 for Beam Measurement and Reporting", 3GPP Draft; R1-1807782 Feature Lead Summary 3 for Beam Measurement and Reporting, 3rd Generation Partnership Project (3GPP), Mobile Competence Centre; 650, Route Des Lucioles; F-06921 Sophia-Antipolis Cedex; France, vol. RAN WG1, No. Busan; May 21, 2018-May 25, 2018 May 29, 2018, XP051463494, Retrieved from the Internet: URL:http://www.3gpp.org/ftp/tsg%5Fran/WG1%5FRL1/TSGR1%5F93/Docs [retrieved on May 29, 2018], 41 pages.
Huawei, et al: "Remaining Issues on HARQ," 3GPP Draft, 3GPP TSG RAN WG1 Meeting 91, R1-1719401, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017, XP051369310, 14 Pages, Retrieved from the Internet: URL: http://www.3gpp.org/ftp/tsg%5Fran/WG1%5FRL1/TSGR1%5F91/Docs/ [retrieved on Nov. 18, 2017] paragraph [02.5]; table 5, Sects 1, 4.
Intel Corporation: "Remaining Issues on Beam Management", 3GPP Draft, 3GPP TSG RAN WG1 Meeting #94, R1-1808669 Remaining Issues on BM, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), 16 Pages, XP051516045, Retrieved from the Internet: URL: http://www.3gpp.org/ftp/tsg%5Fran/WG1%5FRL1/TSGR1%5F94/Docs/R1%2D1808669%2Ezip [retrieved on Aug. 11, 2018], Sect. 4, pp. 7,8,10-p. 11.
International Search Report and Written Opinion—PCT/US2019/048639—ISA/EPO—Nov. 29, 2019.
Nokia: "[96b-NR-09] Email discussion summary on cross-carrier scheduling with different numerologies", 3GPP Draft; R1-1907065 Email Disc Summary on CCS, 3rd Generation Partnership Project (3GPP), Mobile Competence Centre, 650, Route Des Lucioles ; F-06921 Sophia-Antipolis Cedex, France, vol. RAN WG1, No. Reno, NV, USA; May 13, 2019-May 17, 2019 May 13, 2019, XP051728512, Retrieved from the Internet: URL:https://www.3gpp.org/ftp/tsg_ran/WG1_RL1/TSGR1_97/Docs/ [retrieved on May 13, 2019], Sect.s 2.4, 2.5, 21 pages.
Nokia et al., "On Remaining Aspects of NR CNDC and BWPs", 3GPP TSG-RAN WG1 Meeting NRAH #3, 3GPP Draft; R1-1715755 On Remaining Aspects of NR CNDC and BWPs, 3rd Generation Partnership Project (3GPP), Mobile Competence Centre, 650, Route Des Lucioles ; F-06921 Sophia-Antipolis Cedex, France, vol. RAN WG1, No. Nagoya, Japan; Sep. 18, 2017-Sep. 21, 2017, Sep. 17, 2017 (Sep. 17, 2017), 13 Pages, XP051339217, Retrieved from the Internet: URL: http://www.3gpp.org/ftp/Meetings_3GPP_SYNC/RAN1/Docs/ [retrieved on Sep. 17, 2017], Sect.s 3, and 3.1.
Qualcomm Incorporated: "Maintenance for Carrier Aggregation and Bandwidth Parts", 3GPP Draft, R1-1809429, 3GPP TSG RAN WG1 Meeting #94, Maintenance for CA BWP, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 20, 2018-Aug. 24, 2018, Aug. 11, 2018, XP051516792, 18 Pages, Retrieved from the Internet: URL: http://www.3gpp.org/ftp/tsg%5Fran/WG1%5FRL1/TSGR1%5F94/Docs/R1%2D1809429%2Ezip [retrieved on Aug. 11, 2018] p. 11, Sect.s 2.1.4, 3.2, lines 27-30 p. 15, lines 9-20, Sections 1-4.
VIVO: "Cross-Carrier Scheduling with different Numerologies", 3GPP Draft; R1-1901720 Cross-Carrier Scheduling with different Numerologies, 3rd Generation Partnership Project (3GPP), Mobile Competence Centre, 650, Route Des Lucioles ; F-06921 Sophia-Antipolis Cedex, France, vol. RAN WG1, No. Athens, Greece; Feb. 25, 2019-Mar. 1, 2019 Feb. 16, 2019, XP051599416, Retrieved from the Internet: URL:https://www.3gpp.org/ftp/tsg_ran/WG1_RL1/TSGR1_96/Docs/ [retrieved on Feb. 16, 2019], Sect.s 2.4 and 2.5, 8 pages.
VIVO: "Support of Cross-Carrier scheduling with Mix Numerologies", 3GPP Draft; R1-1900155 Support of Cross-Carrier scheduling with Mix Numerologies, 3rd Generation Partnership Project (3GPP), Mobile Competence Centre, 650, Route Des Lucioles ; F-06921 Sophia-Antipolis Cedex, France, vol. RAN WG1, No. Taipei; Jan. 21, 2019-Jan. 25, 2019 Jan. 12, 2019, XP051575777, Retrieved from the Internet: https://www.3gpp.org/ftp/TSG_RAN/WG1_RL1/TSGR1_AH/NR_AH_1901/Docs/ [retrieved on Jan. 12, 2019], Sect. 3.4, 6 pages.
ZTE Corporation: "Discussion on Cross-Carrier Scheduling with different Numerologies", 3GPP Draft; R1-1906420 Discussion on Cross-Carrier Scheduling with different Numerologies, 3rd Generation Partnership Project (3GPP), Mobile Competence Centre, 650, Route Des Lucioles ; F-06921 Sophia-Antipolis Cedex, France, vol. RAN WG1, No. Reno, USA; May 13, 2019-May 17, 2019 May 13, 2019, XP051727870, Retrieved from the Internet: URL:https://www.3gpp.org/ftp/tsg_ran/WG1_RL1/TSGR1_97/Docs/ [retrieved on May 13, 2019] Sect.s 3, 4, 6 pages.
Qualcomm Incorporated: "Beam Management for NR", 3GPP TSG-RAN WG1 Meeting #94, R1-1809711, Gothenburg, Sweden, Aug. 20-24, 2018, Aug. 17, 2018, pp. 1-16; Sections 5, 11.
Qualcomm Incorporated: "CA with Mixed Numerology", 3GPP TSG RAN WG1 Meeting #90, R1-1713456, Aug. 21-25, 2017 Prague, Czech Republic, Aug. 17, 2017, pp. 1-6; Section 1.
VIVO: "Remaining Issues on Beam Measurement and Reporting", 3GPP TSG RAN WG1 Meeting #94, R1-1808221, Gothenburg, Sweden, Aug. 20-24, 2018, Aug. 10, 2018, 7 Pages; Sections 2.1.3, 2.1.5.
European Search Report—EP24171794—Search Authority—The Hague—Nov. 18, 2024.

\* cited by examiner

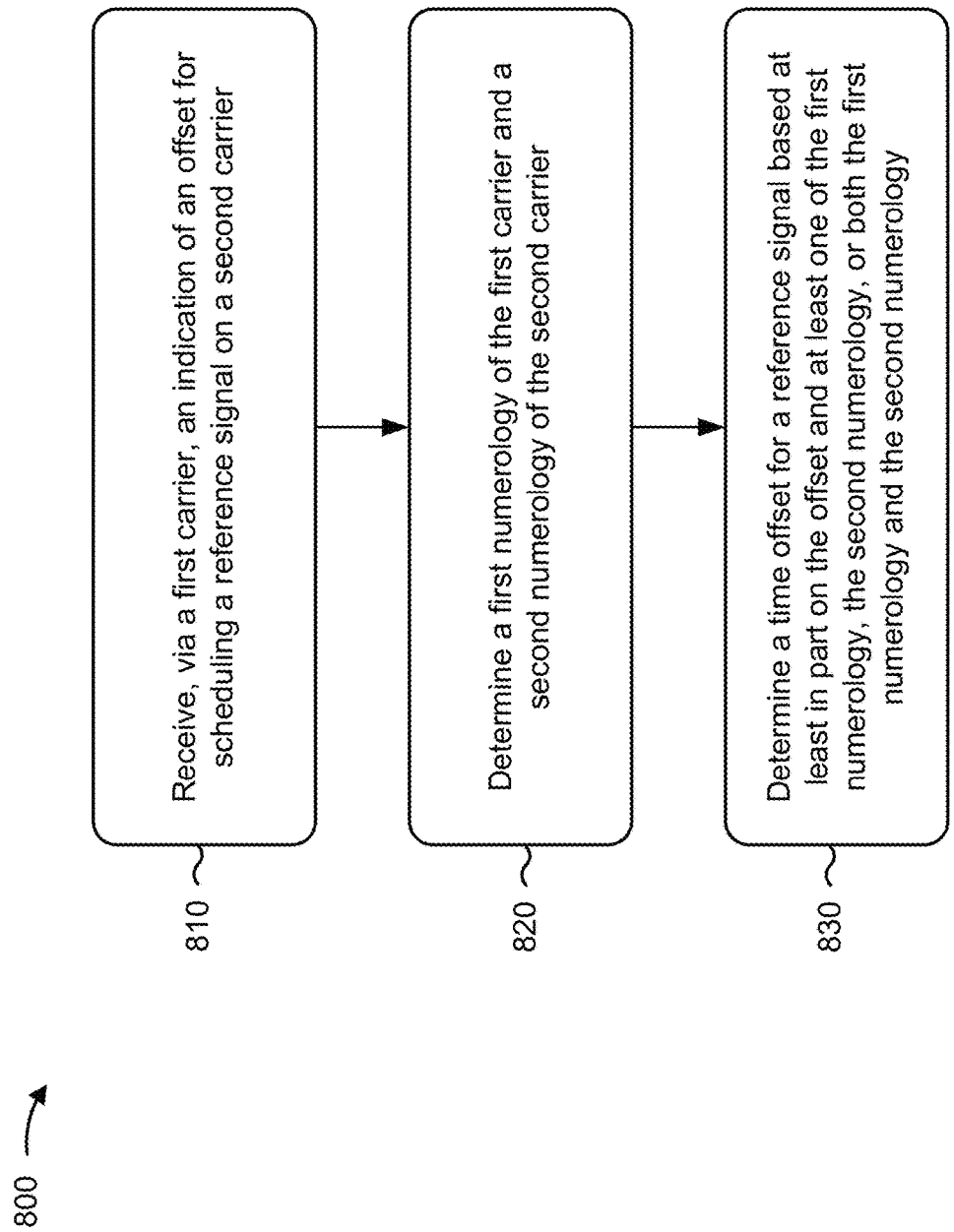

CROSS-CARRIER REFERENCE SIGNAL SCHEDULING OFFSET AND THRESHOLD DETERMINATION

RELATED APPLICATION

This application is a continuation of U.S. patent application Ser. No. 16/146,628, filed Sep. 28, 2018, which is incorporated herein by reference.

TECHNICAL FIELD

Aspects of the technology described below generally relate to wireless communication, and more particularly to techniques and apparatuses for cross-carrier reference signal scheduling offset and threshold determination. Some techniques and apparatuses described herein enable and provide wireless communication devices and systems configured for reduced ambiguity and fewer errors when signaling time offsets and/or time offset thresholds in cross-carrier scheduling where different carriers use different numerologies.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a base station, may include receiving an indication of multiple scheduling offset thresholds corresponding to multiple numerologies used by a user equipment (UE), wherein each scheduling offset threshold indicates, for a corresponding numerology, a minimum duration between downlink control information (DCI) and a reference signal scheduled by the DCI; determining a first numerology of a first carrier of the UE and a second numerology of a second carrier of the UE; determining a scheduling offset threshold, of the multiple scheduling offset thresholds, based at least in part on the first numerology, the second numerology, or both the first numerology and the second numerology; and scheduling a reference signal for the UE based at least in part on the scheduling offset threshold.

In some aspects, a base station for wireless communication may include memory and one or more processors operatively coupled to the memory. The memory and the one or more processors may be configured to receive an indication of multiple scheduling offset thresholds corresponding to multiple numerologies used by a user equipment (UE), wherein each scheduling offset threshold indicates, for a corresponding numerology, a minimum duration between downlink control information (DCI) and a reference signal scheduled by the DCI; determine a first numerology of a first carrier of the UE and a second numerology of a second carrier of the UE; determine a scheduling offset threshold, of the multiple scheduling offset thresholds, based at least in part on the first numerology, the second numerology, or both the first numerology and the second numerology; and schedule a reference signal for the UE based at least in part on the scheduling offset threshold.

In some aspects, a non-transitory computer-readable medium may store one or more instructions for wireless communication. The one or more instructions, when executed by one or more processors of a base station, may cause the one or more processors to receive an indication of multiple scheduling offset thresholds corresponding to multiple numerologies used by a user equipment (UE), wherein each scheduling offset threshold indicates, for a corresponding numerology, a minimum duration between downlink control information (DCI) and a reference signal scheduled by the DCI; determine a first numerology of a first carrier of the UE and a second numerology of a second carrier of the UE; determine a scheduling offset threshold, of the multiple scheduling offset thresholds, based at least in part on the first numerology, the second numerology, or both the first numerology and the second numerology; and schedule a reference signal for the UE based at least in part on the scheduling offset threshold.

In some aspects, an apparatus for wireless communication may include means for receiving an indication of multiple scheduling offset thresholds corresponding to multiple numerologies used by a user equipment (UE), wherein each scheduling offset threshold indicates, for a corresponding numerology, a minimum duration between downlink control information (DCI) and a reference signal scheduled by the DCI; means for determining a first numerology of a first carrier of the UE and a second numerology of a second carrier of the UE; means for determining a scheduling offset threshold, of the multiple scheduling offset thresholds, based at least in part on the first numerology, the second numerology, or both the first numerology and the second numerology; and means for scheduling a reference signal for the UE based at least in part on the scheduling offset threshold.

In some aspects, a method of wireless communication, performed by a user equipment (UE), may include receiving, via a first carrier, an indication of an offset for scheduling a reference signal on a second carrier, wherein the offset indicates a duration between downlink control information (DCI), that schedules the reference signal, and the reference signal; determining a first numerology of the first carrier and a second numerology of the second carrier; and determining a time offset for the reference signal based at least in part on the offset and at least one of the first numerology, the second numerology, or both the first numerology and the second numerology.

In some aspects, a user equipment for wireless communication may include memory and one or more processors operatively coupled to the memory. The memory and the one or more processors may be configured to receive, via a first carrier, an indication of an offset for scheduling a reference signal on a second carrier, wherein the offset indicates a duration between downlink control information (DCI), that schedules the reference signal, and the reference signal; determine a first numerology of the first carrier and a second numerology of the second carrier; and determine a time offset for the reference signal based at least in part on the offset and at least one of the first numerology, the second numerology, or both the first numerology and the second numerology.

In some aspects, a non-transitory computer-readable medium may store one or more instructions for wireless communication. The one or more instructions, when executed by one or more processors of a user equipment, may cause the one or more processors to receive, via a first carrier, an indication of an offset for scheduling a reference signal on a second carrier, wherein the offset indicates a duration between downlink control information (DCI), that schedules the reference signal, and the reference signal; determine a first numerology of the first carrier and a second numerology of the second carrier; and determine a time offset for the reference signal based at least in part on the offset and at least one of the first numerology, the second numerology, or both the first numerology and the second numerology.

In some aspects, an apparatus for wireless communication may include means for receiving, via a first carrier, an indication of an offset for scheduling a reference signal on a second carrier, wherein the offset indicates a duration between downlink control information (DCI), that schedules the reference signal, and the reference signal; means for determining a first numerology of the first carrier and a second numerology of the second carrier; and means for determining a time offset for the reference signal based at least in part on the offset and at least one of the first numerology, the second numerology, or both the first numerology and the second numerology.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain aspects of this disclosure and are therefore not to be considered limiting of its scope. The same reference numbers in different drawings may identify the same or similar elements.

FIGS. 7-8 are diagrams illustrating example processes performed in connection with determining a scheduling offset or a scheduling offset threshold for a reference signal in a cross-carrier scheduling scenario, in accordance with various aspects of the present disclosure.

DETAILED DESCRIPTION

Figure 1:
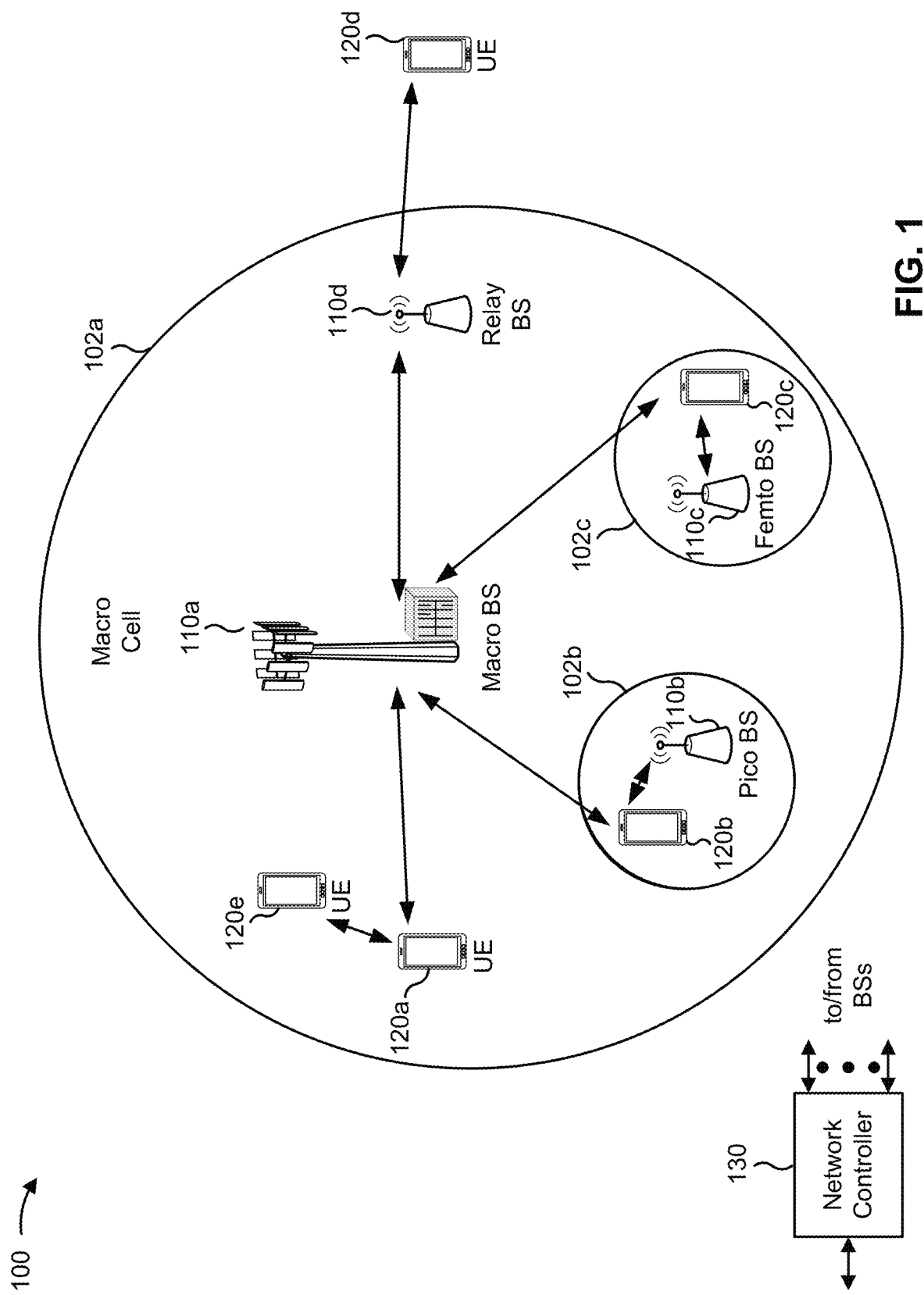
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
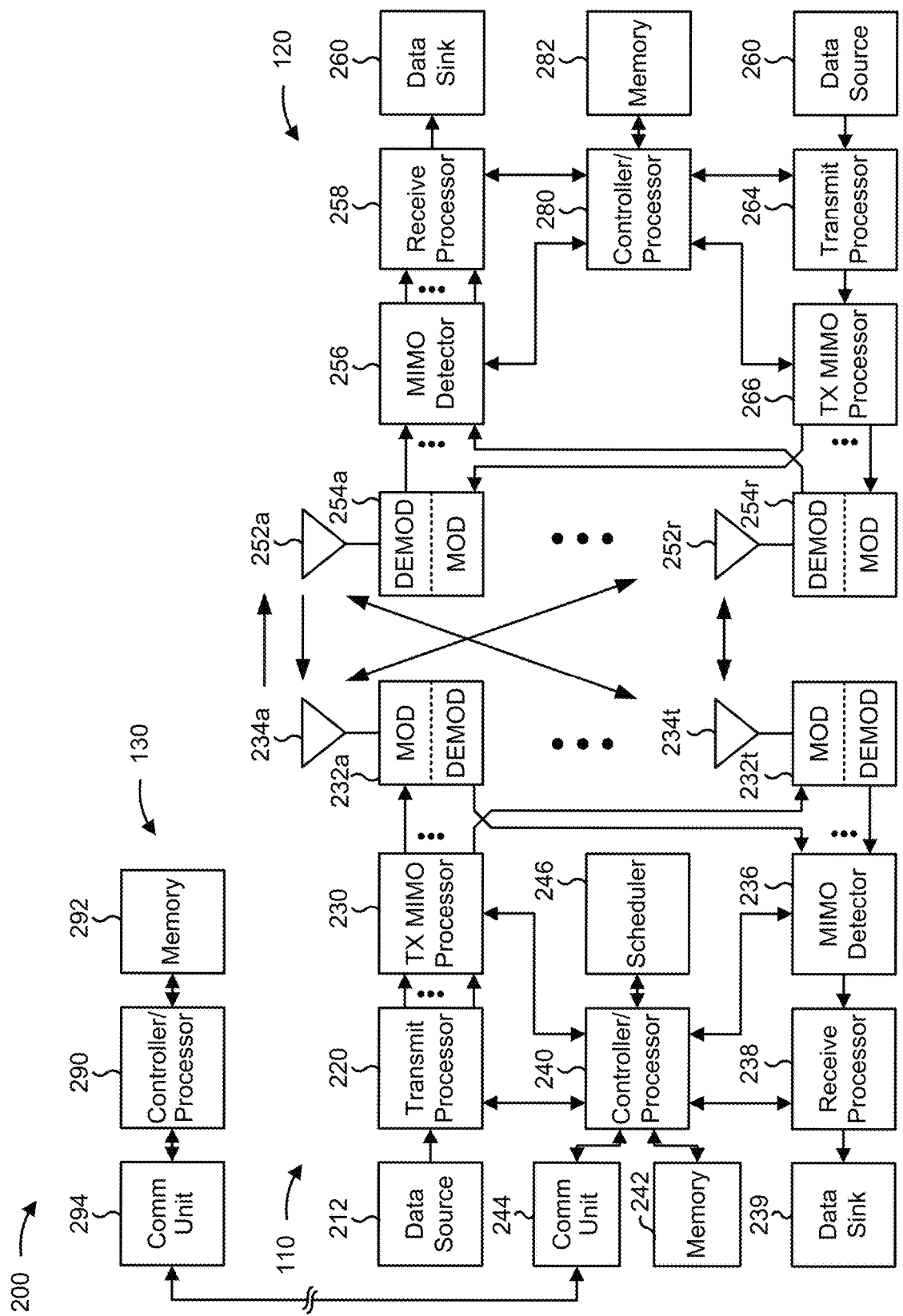
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with cross-carrier reference signal scheduling offset and threshold determination, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, via a first carrier, an indication of an offset for scheduling a reference signal on a second carrier, wherein the offset indicates a duration between downlink control information (DCI), that schedules the reference signal, and the reference signal; means for determining a first numerology of the first carrier and a second numerology of the second carrier; means for determining a time offset for the reference signal based at least in part on the offset and at least one of the first numerology, the second numerology, or both the first numerology and the second numerology; and/or the like. In some aspects, such means may include one or more components of UE 120 described in connection with FIG. 2, such as antenna 252, DEMOD 254, MOD 254, MIMO detector 256, receive processor 258, transmit processor 264, TX MIMO processor 266, controller/processor 280, and/or the like.

In some aspects, base station 110 may include means for receiving an indication of multiple scheduling offset thresholds corresponding to multiple numerologies used by a user equipment (UE), wherein each scheduling offset threshold indicates, for a corresponding numerology, a minimum duration between downlink control information (DCI) and a reference signal scheduled by the DCI; means for determining a first numerology of a first carrier of the UE and a second numerology of a second carrier of the UE; means for determining a scheduling offset threshold, of the multiple scheduling offset thresholds, based at least in part on the first numerology, the second numerology, or both the first numerology and the second numerology; means for scheduling a reference signal for the UE based at least in part on the scheduling offset threshold; and/or the like. In some aspects, such means may include one or more components of base station 110 described in connection with FIG. 2, such as transmit processor 220, TX MIMO processor 230, DEMOD 232, MOD 232, antenna 234, MIMO detector 236, receive processor 238, controller/processor 240, and/or the like.

As indicated above, FIG. 2 is provided merely as an example. Other examples are possible and may differ from what was described with regard to FIG. 2.

Figure 3:
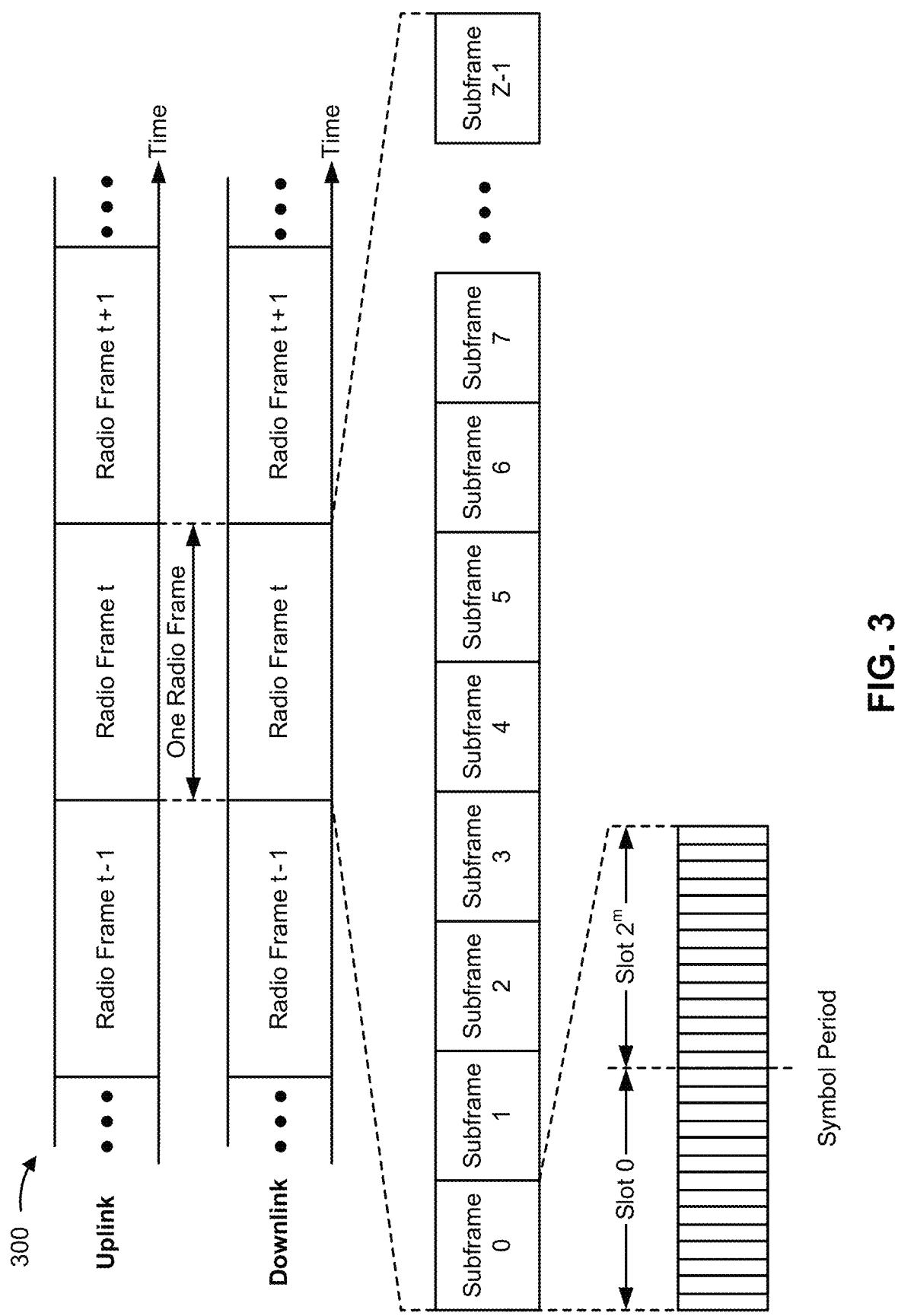
FIG. 3 is a block diagram conceptually illustrating an example of a frame structure in a wireless communication network, in accordance with various aspects of the present disclosure.

FIG. 3 shows an example frame structure 300 for FDD in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z ($Z \geq 1$) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs. In some aspects, the PSS, SSS, and PBCH may be transmitted in a synchronization signal block (SSB).

As indicated above, FIG. 3 is provided as an example. Other examples are possible and may differ from what was described with regard to FIG. 3.

Figure 4:
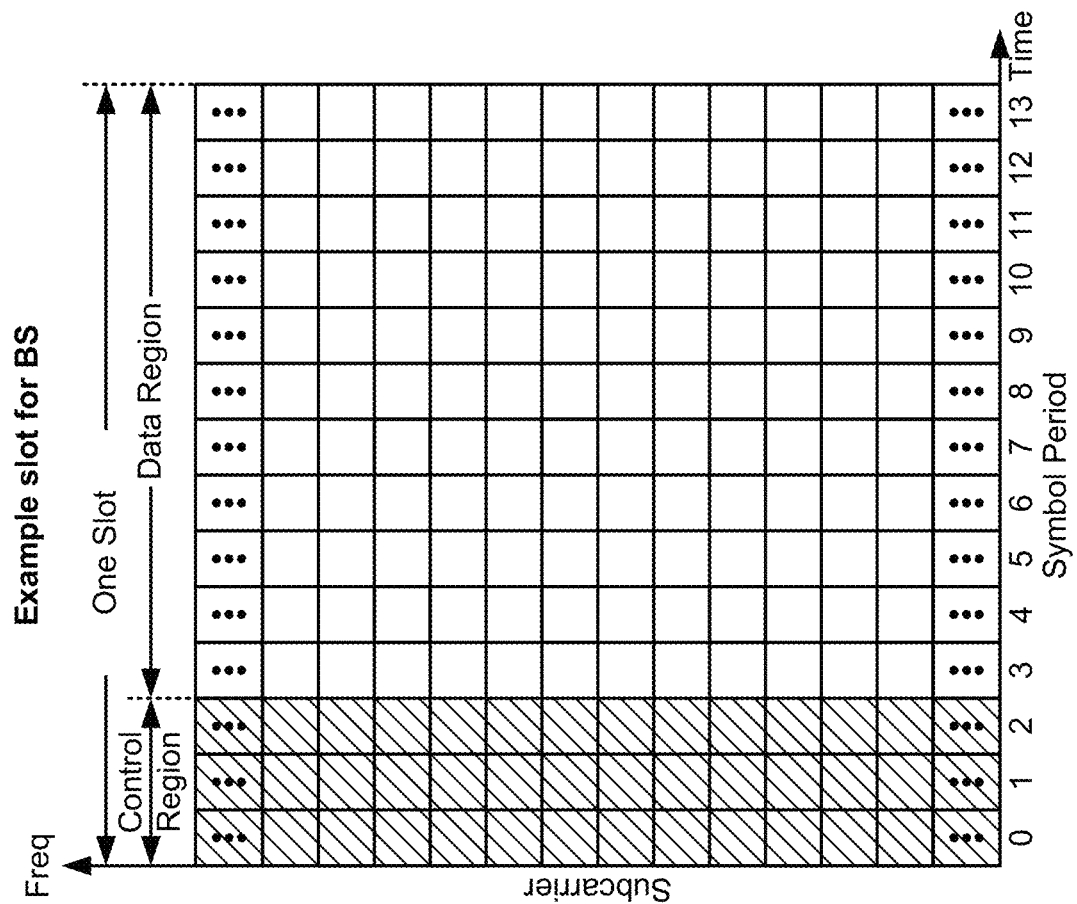
FIG. 4 is a block diagram conceptually illustrating an example slot format with a normal cyclic prefix (as opposed to an extended cyclic prefix), in accordance with various aspects of the present disclosure.

FIG. 4 shows an example slot format 410 with a normal cyclic prefix (as opposed to an extended cyclic prefix). The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

In carrier aggregation, a UE 120 and a base station 110 may communicate via multiple carriers. The carriers may have different frequencies. These features can enable an increased bandwidth and throughput for communications between the UE 120 and the base station 110. In some carrier aggregation configurations, cross-carrier scheduling may be used. Generally, cross-carrier scheduling involves transmissions across carriers. These transmissions may include a variety of timing options (as discussed below), and can be used for either uplink or downlink transmissions.

Uplink or downlink cross-carrier transmissions may include data and/or control information. For example, in some cross-carrier scenarios, a first carrier (e.g., a scheduling carrier) is used to receive control information (e.g., downlink control information (DCI) and/or the like) that schedules communications on a second carrier (e.g., a scheduled carrier). In some aspects, DCI received via a scheduling carrier (e.g., via a physical downlink control channel (PDCCH)) may be used to indicate scheduled resources, a modulation and coding scheme (MCS), and/or other information for a communication (e.g., a physical downlink shared channel (PDSCH) communication) scheduled on a scheduled carrier. In some aspects, a scheduling carrier may be a primary carrier, and a scheduled carrier may be a secondary carrier. Additionally, or alternatively, a scheduling carrier may be a first secondary carrier (e.g., a primary secondary carrier), and a scheduled carrier may be a second secondary carrier.

Differing numerology approaches may be used for cross-carrier implementations. In some configurations, the UE 120 may use a first numerology for a scheduling carrier and a second numerology for a scheduled carrier. The different numerologies may correspond to different sub-carrier spacings, such as 15 kHz, 30 kHz, 60 kHz, 120 kHz, and/or the like. When different numerologies are used for the different carriers, a duration of a symbol may be different for the different carriers. For example, a larger numerology (such as 120 kHz) may have a wider subcarrier spacing and a shorter symbol duration, and a smaller numerology (such as 15 kHz) may have a narrower subcarrier spacing and a longer symbol duration. For example, a numerology of 120 kHz may have a symbol duration of 8.33 microseconds, a numerology of 60 kHz may have a symbol duration of 16.67 microseconds, a numerology of 30 kHz may have a symbol duration of 33.33 microseconds, and a numerology of 15 kHz may have a symbol duration of 66.67 microseconds. Similarly, slots with the same symbol configuration (e.g., that use the same number of symbols, such as 7 symbols or 14 symbols per slot), may have a shorter duration for a larger numerology and a longer duration for a smaller numerology.

Some scheduling information communicated between a UE 120 and a base station 110 may indicate timing for various operations. Timing may be communicated in terms of a number of slots, a number of symbols, and/or the like. For example, a UE 120 may notify the base station 110 of a scheduling offset threshold of the UE 120 using a number of symbols. A scheduling offset threshold may indicate a minimum duration (e.g., a minimum number of symbols, a minimum number of slots, a minimum number of TTIs, and/or the like) required for the UE 120 to switch to a different beam (e.g., due to mobility, better signal for reception, for another carrier, and/or the like). When scheduling a reference signal (e.g., an aperiodic reference signal that requires the UE 120 to switch beams), the base station 110 may ensure that the reference signal is scheduled such that the number of symbols between transmission of DCI, that schedules the reference signal, and a subsequent transmission of the reference signal is greater than or equal to the scheduling offset threshold. If the duration between the DCI and the reference signal is greater than or equal to the scheduling offset threshold, then the DCI may indicate a beam for transmission of the reference signal, which may be different than the beam on which DCI is transmitted. If the duration is less than the scheduling offset threshold, then the UE 120 may need to use a default beam for the reference signal (e.g., the same beam on which the DCI was transmitted). Further, DCI may indicate a slot offset that represents a number of slots between the DCI and the subsequent reference signal, and may be used by the UE 120 to determine a slot in which the reference signal is scheduled (e.g., for transmission or reception).

As mentioned above, cross-carrier transmissions may include a variety of timing options. For example, when the UE 120 uses a single carrier with a single numerology, or when the UE 120 uses multiple carriers with the same numerology, such numerology may be used to correctly interpret a timing (e.g., for the scheduling offset threshold and/or the slot offset) from an indicated number of slots and/or symbols. Further, if a UE 120 uses multiple carriers with different numerologies and each carrier schedules itself, the numerology of a specific carrier may be used to correctly interpret a timing associated with scheduling for that specific carrier. Yet if a UE 120 uses cross-carrier scheduling with multiple carriers that use different numerologies, there is ambiguity about which numerology to use (e.g., the numerology of the scheduling carrier or the numerology of the scheduled carrier) to correctly interpret a timing from an indicated number of slots and/or symbols (e.g., because such slots and/or symbols have different durations for different numerologies).

Ambiguity may lead to scheduling errors when a timing is incorrectly interpreted from an indicated number of slots and/or symbols. For example, when a base station 110 incorrectly interprets a timing of a scheduling offset threshold indicated by the UE 120, then the base station 110 may schedule a reference signal with a timing that results in the UE 120 being incapable of receiving the reference signal (e.g., when the base station 110 interprets the timing of the scheduling offset threshold as a smaller timing than intended by the UE 120). As another example, when a UE 120 incorrectly interprets a slot offset indicated by the base station 110 (e.g., because the UE 120 and the base station 110 are using different assumptions about which numerology should be used for communicating scheduling information), then the UE 120 may attempt to transmit and/or receive a reference signal in a different slot than the slot in which the reference signal is actually scheduled by the base station 110. This may result in the UE 120 failing to receive a reference signal transmitted by the base station 110, or may result in the base station 110 failing to receive a reference signal transmitted by the UE 120. This may waste network resources, may waste resources of the UE 120 and/or the base station 110 (e.g., processing resources, memory resources, and/or the like) due to retransmissions and/or failed decoding, may lead to further errors (e.g., errors in channel estimation or other information derived from the reference signal), and/or the like.

Techniques and apparatuses described herein can eliminate or reduce ambiguous scenario occurrences. That is, techniques described herein can create instances where less ambiguous scenarios occur or reduce them altogether when a UE 120 uses cross-carrier scheduling with multiple carriers that use different numerologies. As a result, the UE 120 and the base station 110 may correctly interpret a timing from an indicated number of slots and/or symbols (or other transmission time interval (TTI)), thereby conserving network resources, conserving resources of the UE 120 and/or the base station 110, reducing errors, leading to more accurate channel estimation, and/or the like.

Figure 5:
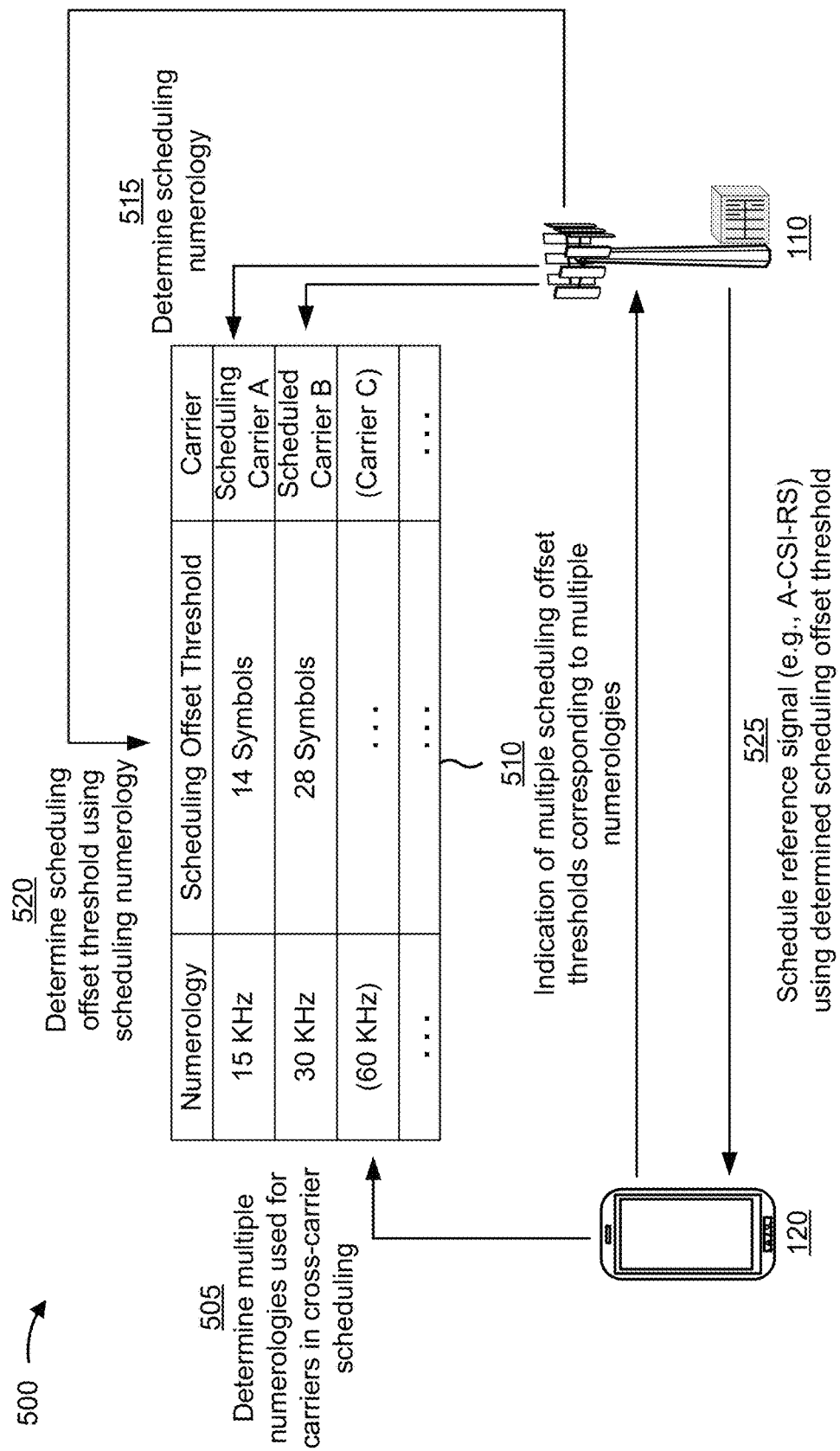
FIG. 5 is a diagram illustrating an example of a scheduling offset threshold determination for a reference signal in a cross-carrier scheduling scenario, in accordance with various aspects of the present disclosure.

FIG. 5 is a diagram illustrating an example 500 of a scheduling offset threshold determination for a reference signal in a cross-carrier scheduling scenario, in accordance with various aspects of the present disclosure.

As shown by reference number 505, a UE 120 may determine that the UE 120 is using multiple (e.g., different, alternative, distinct, repetitive) numerologies for different carriers used in carrier aggregation. The UE 120 can be configured to use cross-carrier scheduling for some or all of those carriers. In some aspects, the UE 120 may make these determinations based at least in part on a configuration of the UE 120. These determinations may be negotiated, transmitted, and/or received during, for example, radio resource control (RRC) configuration (e.g., in one or more RRC messages). For example, the UE 120 may determine that a first carrier (e.g., a scheduling carrier) and a second carrier (e.g., a scheduled carrier), scheduled by the first carrier, are configured with different numerologies. A first carrier may schedule a second carrier when control information (e.g., DCI), that includes scheduling information for the second carrier, is received via the first carrier.

As shown by reference number 510, the UE 120 may transmit, and the base station 110 may receive, an indication of multiple scheduling offset thresholds. These can correspond to multiple numerologies used by the UE 120 for the multiple carriers. In some aspects, such indication may be included in a UE capability report. As shown, each scheduling offset threshold may indicate, for a corresponding numerology, a minimum number of symbols between DCI and a reference signal scheduled by the DCI. For example, and as shown, a first carrier (e.g., a scheduling carrier, shown as Scheduling Carrier A) may have a first numerology of 15 kHz. As further shown, the UE 120 may indicate a first scheduling offset threshold of 14 symbols for the first carrier and/or the first numerology, meaning that the base station 110 should not schedule a reference signal that has a starting symbol that is less than 14 symbols (e.g., interpreted using the first numerology of 15 kHz) after an ending symbol of the DCI that schedules the reference signal. Although a minimum duration between DCI and a reference signal scheduled by the DCI is described above as being expressed as a minimum number of symbols, in some aspects, the minimum duration may be expressed in terms of another TTI, such as a minimum number of slots, a minimum number of subframes, and/or the like.

Similarly, and as further shown, a second carrier (e.g., a scheduled carrier, shown as Scheduled Carrier B) may have a second numerology of 30 kHz. As further shown, the UE 120 may indicate a second scheduling offset threshold of 28 symbols for the second carrier and/or the second numerology, meaning that the base station 110 should not schedule a reference signal that has a starting symbol that is less than 28 symbols (e.g., interpreted using the second numerology of 30 kHz) after an ending symbol of the DCI that schedules the reference signal.

In some aspects, the scheduling offset threshold values may be different for the different numerologies and/or carriers (e.g., shown as 14 symbols and 28 symbols). However, in some cases, the different scheduling offset threshold values may correspond to a same amount of time when interpreted using the appropriate numerology. In some aspects, the different scheduling offset threshold values may correspond to different amounts of time when interpreted using the appropriate numerology.

The numerologies and scheduling offset thresholds indicated above are provided as examples. In some aspects, the UE 120 may use other numerologies (e.g., 60 kHz, 120 kHz, 240 kHz, and/or the like) and/or other scheduling offset thresholds (e.g., 48 symbols, 224 symbols, 336 symbols, and/or the like). Additionally, or alternatively, the UE 120 may use more than two carriers for carrier aggregation. In some aspects, only two different numerologies may be used across the group of all carriers used for carrier aggregation. In some aspects, more than two numerologies may be used across the group of all carriers used for carrier aggregation. In some aspects, the UE 120 may indicate a scheduling offset threshold for each carrier. Additionally, or alternatively, the UE 120 may indicate a scheduling offset threshold for each numerology (e.g., which may conserve resources when the number of numerologies used is less than the number of carriers).

As shown by reference number 515, the base station 110 may determine a numerology to be used for scheduling (e.g., sometimes referred to herein as a scheduling numerology). The scheduling numerology may represent a common numerology used by both the UE 120 and the base station 110 to interpret a timing, associated with scheduling information, from an indicated number of slots, symbols, TTIs, and/or the like. By using a common scheduling numerology, ambiguities may be eliminated, as described elsewhere herein.

Scheduling numerology determinations may be based on a number of factors. According to some aspects, the scheduling numerology may be determined based at least in part on the first numerology (e.g., corresponding to the scheduling carrier), the second numerology (e.g., corresponding to the scheduled carrier), or both the first numerology and the second numerology. In this case, the base station 110 may determine the first numerology of the scheduling carrier and the second numerology of the scheduled carrier (e.g., based at least in part on the indication from the UE 120, stored information configured during RRC configuration, and/or the like), and may determine the scheduling numerology using the first numerology and/or the second numerology.

A base station 110 may utilize differing numerologies in varying manners. In some aspects, the base station 110 may use the first numerology (e.g., of the scheduling carrier) as the scheduling numerology. In some aspects, the base station 110 may use the second numerology (e.g., of the scheduled carrier) as the scheduling numerology. In some aspects, the base station 110 may determine the scheduling numerology as a function of the first numerology and the second numerology. For example, the base station 110 may use the maximum numerology, of the first numerology and the second numerology, as the scheduling numerology. Alternatively, the base station 110 may use the minimum numerology, of the first numerology and the second numerology, as the scheduling numerology.

Regardless of how a scheduling numerology is determined, the base station 110 and the UE 120 may determine the same scheduling numerology. For example, the base station 110 and the UE 120 may select the same numerology as the scheduling numerology (e.g., the first numerology or the second numerology), may apply the same function to the first numerology and the second numerology to determine the scheduling numerology, and/or the like. In some aspects, the scheduling numerology may be determined based at least in part on pre-specified information hard coded in memory (e.g., provisioned and stored in memory according to a wireless communication standard). Additionally, or alternatively, the scheduling numerology may be determined based at least in part on a configuration, which may indicated in an RRC message (e.g., an RRC configuration message, an RRC reconfiguration message, and/or the like). In either case, by using the same scheduling numerology, the base station 110 and the UE 120 may interpret timing in the same manner, thereby reducing ambiguity associated with timing determinations.

As shown by reference number 520, the base station 110 may determine a scheduling offset threshold based at least in part on the scheduling numerology. In some aspects, the base station 110 may identify the scheduling offset threshold that corresponds to the scheduling numerology, as indicated by the UE 120. For example, if the first numerology (e.g., 15 kHz) is used as the scheduling numerology, then the base station 110 may use a scheduling offset threshold of 14 symbols, and may interpret a duration of those symbols using the first numerology to determine a timing of the scheduling offset threshold. As another example, if the second numerology (e.g., 30 kHz) is used as the scheduling numerology, then the base station 110 may use a scheduling offset threshold of 28 symbols, and may interpret a duration of those symbols using the second numerology to determine a timing of the scheduling offset threshold.

As shown by reference number 525, the base station 110 may schedule a reference signal for the UE 120 based at least in part on the determined scheduling offset threshold. For example, the base station 110 may schedule the reference signal such that a timing between DCI (e.g., a last symbol of DCI), that includes scheduling information for the reference signal, and the reference signal (e.g., a first symbol of the reference signal) is greater than or equal to a timing indicated by the scheduling offset threshold. In some aspects, the reference signal may be an aperiodic reference signal, such as an aperiodic channel state information reference signal (CSI-RS) (e.g., shown as A-CSI-RS) and/or the like. In some aspects, the reference signal may be scheduled for a different beam than an active beam being used by the UE 120 to communicate with the base station 110. In this way, the base station 110 may ensure that the UE 120 is capable of receiving the reference signal despite a beam switching limitation of the UE 120.

In some aspects, the base station 110 may schedule the reference signal by transmitting DCI that includes scheduling information for the reference signal. In some aspects, the scheduling information may indicate a slot offset. The slot offset may indicate a number of slots between the DCI and the reference signal, and may be determined based at least in part on the scheduling offset threshold (e.g., where the timing represented by the slot offset is greater than or equal to the timing indicated by the scheduling offset threshold). As described in more detail below in connection with FIG. 6, the base station 110 may determine a value for the slot offset and/or the UE 120 may interpret the value of the slot offset using the scheduling numerology. Although some aspects are described herein in connection with a slot offset and/or a number of slots, some aspects may be implemented using a TTI offset and/or a number of TTIs other than slots (e.g., symbols, subframes, and/or the like).

As indicated above, FIG. 5 is provided as an example. Other examples are possible and may differ from what was described with respect to FIG. 5.

Figure 6:
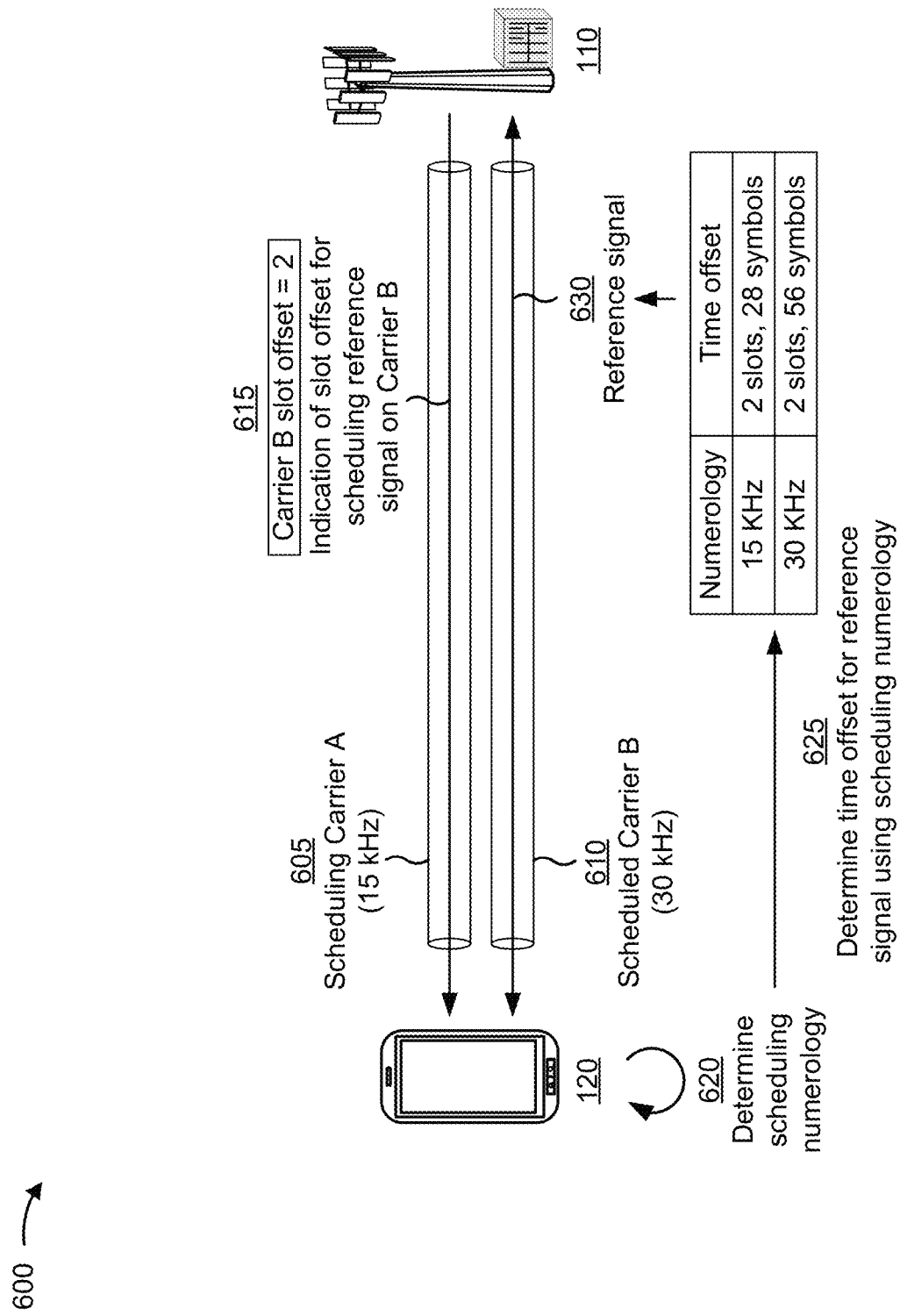
FIG. 6 is a diagram illustrating an example of a scheduling offset determination for a reference signal in a cross-carrier scheduling scenario, in accordance with various aspects of the present disclosure.

FIG. 6 is a diagram illustrating an example 600 of a scheduling offset determination for a reference signal in a cross-carrier scheduling scenario, in accordance with various aspects of the present disclosure.

Multiple carriers are illustrated as deployment options in FIG. 6. As shown by reference number 605, a UE 120 and a base station 110 may communicate using a first carrier (shown as Carrier A). A first carrier can be a scheduling carrier. The scheduling carrier may be configured with a first numerology, shown as 15 kHz as an example. As shown by reference number 610, the UE 120 and the base station 110 may also communicate using a second carrier (shown as Carrier B). A second carrier can be a scheduled carrier. The scheduled carrier may be configured with a second numerology, shown as 30 kHz as an example. As described elsewhere herein, the base station 110 may transmit scheduling information, for the scheduled carrier, via the scheduling carrier.

As shown by reference number 615, the base station 110 may transmit, and the UE 120 may receive, scheduling information. As shown, the scheduling information may be transmitted via the scheduling carrier, and may include scheduling information for scheduling a reference signal on the second carrier. As shown, the scheduling information may indicate an offset (e.g., a slot offset, a symbol offset, a TTI offset, and/or the like) for scheduling the reference signal. The offset may indicate a number of slots between transmission of DCI, that includes scheduling information for the reference signal, and transmission of the reference signal. As described above in connection with FIG. 5, in some aspects, the offset may be determined by the base station 110 based at least in part on a scheduling offset threshold indicated to the base station 110 by the UE 120. Although some aspects are described herein as expressing the offset as a number of slots (e.g., a slot offset), in some aspects, the offset may be expressed in terms of another TTI (e.g., a TTI offset), such as a number of symbols (e.g., a symbol offset), a number of subframes (e.g., a subframe offset), and/or the like.

As shown by reference number 620, the UE 120 may determine a numerology to be used for scheduling (e.g., sometimes referred to herein as a scheduling numerology). As described above in connection with FIG. 5, the scheduling numerology may represent a common numerology used by both the UE 120 and the base station 110 to interpret a timing, associated with scheduling information, from an indicated number of slots, symbols, TTIs, and/or the like.

Scheduling determinations may be determined based on a number of factors. In some aspects, the scheduling numerology may be determined based at least in part on the first numerology (e.g., corresponding to the scheduling carrier), the second numerology (e.g., corresponding to the scheduled carrier), or both the first numerology and the second numerology. In this case, the UE 120 may determine the first numerology of the scheduling carrier and the second numerology of the scheduled carrier (e.g., based at least in part on a carrier configuration, stored information configured during RRC configuration, and/or the like), and may determine the scheduling numerology using the first numerology and/or the second numerology. UEs 120 can vary numerology selections for scheduling. For example, in some aspects, the UE 120 may use the first numerology (e.g., of the scheduling carrier) as the scheduling numerology. In some aspects, the UE 120 may use the second numerology (e.g., of the scheduled carrier) as the scheduling numerology. In some aspects, UE 120 may determine the scheduling numerology as a function of the first numerology and the second numerology. For example, the UE 120 may use the maximum numerology, of the first numerology and the second numerology, as the scheduling numerology. Alternatively, the UE 120 may use the minimum numerology, of the first numerology and the second numerology, as the scheduling numerology. As described above in connection with FIG. 5, regardless of how the scheduling numerology is determined, the base station 110 and the UE 120 may determine the same scheduling numerology (e.g., which may be based at least in part on pre-specified information, pre-configured information, and/or the like). In this way, the base station 110 and the UE 120 may interpret timing in the same manner, thereby reducing ambiguity associated with timing determinations.

As shown by reference number 625, the UE 120 may determine a time offset for a reference signal. This can be based at least in part on the slot offset and the scheduling numerology. For example, the UE 120 may interpret a time offset (e.g., a timing), represented by a value of the slot offset, based at least in part on the scheduling numerology. For example, if the first numerology (e.g., 15 kHz) is used as the scheduling numerology, then the UE 120 may interpret a slot offset of 2 slots as 28 symbols, where those symbols have a duration defined by a 15 kHz numerology (e.g., 66.67 microseconds). As another example, if the second numerology (e.g., 30 kHz) is used as the scheduling numerology, then the UE 120 may interpret a slot offset of 2 slots as 56 symbols, where those symbols have a duration defined by a 30 kHz numerology (e.g., 33.33 microseconds).

As shown by reference number 630, the UE 120 may determine a scheduled time (e.g., a slot, a symbol, a TTI, and/or the like) for a reference signal. This can be based at least in part on the time offset, and may transmit and/or receive the reference signal at the scheduled time. In some aspects, the reference signal may be an aperiodic reference signal, such as an A-CSI-RS, a sounding reference signal (SRS), and/or the like. In the case where the reference signal is an A-CSI-RS, the UE 120 may receive the A-CSI-RS from the base station 110 at the scheduled time determined from the time offset. In the case where the reference signal is an SRS, the UE 120 may transmit the SRS to the base station 110 at the scheduled time determined from the time offset.

When the base station 110 and the UE 120 use a same numerology to interpret the slot offset, the base station 110 and the UE 120 may align their timing determinations such that the UE 120 and the base station 110 can receive reference signals from one another. In this way, ambiguity in timing determinations and/or scheduling determinations may be reduced or eliminated when the UE 120 and the base station 110 use cross-carrier scheduling with multiple carriers configured with different numerologies. As a result, the UE 120 and the base station 110 may correctly interpret a timing from an indicated number of slots and/or symbols (or other transmission time interval (TTI)), thereby conserving network resources, conserving resources of the UE 120 and/or the base station 110, reducing errors, leading to more accurate channel estimation, and/or the like.

As indicated above, FIG. 6 is provided as an example. Other examples are possible and may differ from what was described with respect to FIG. 6.

Figure 7:
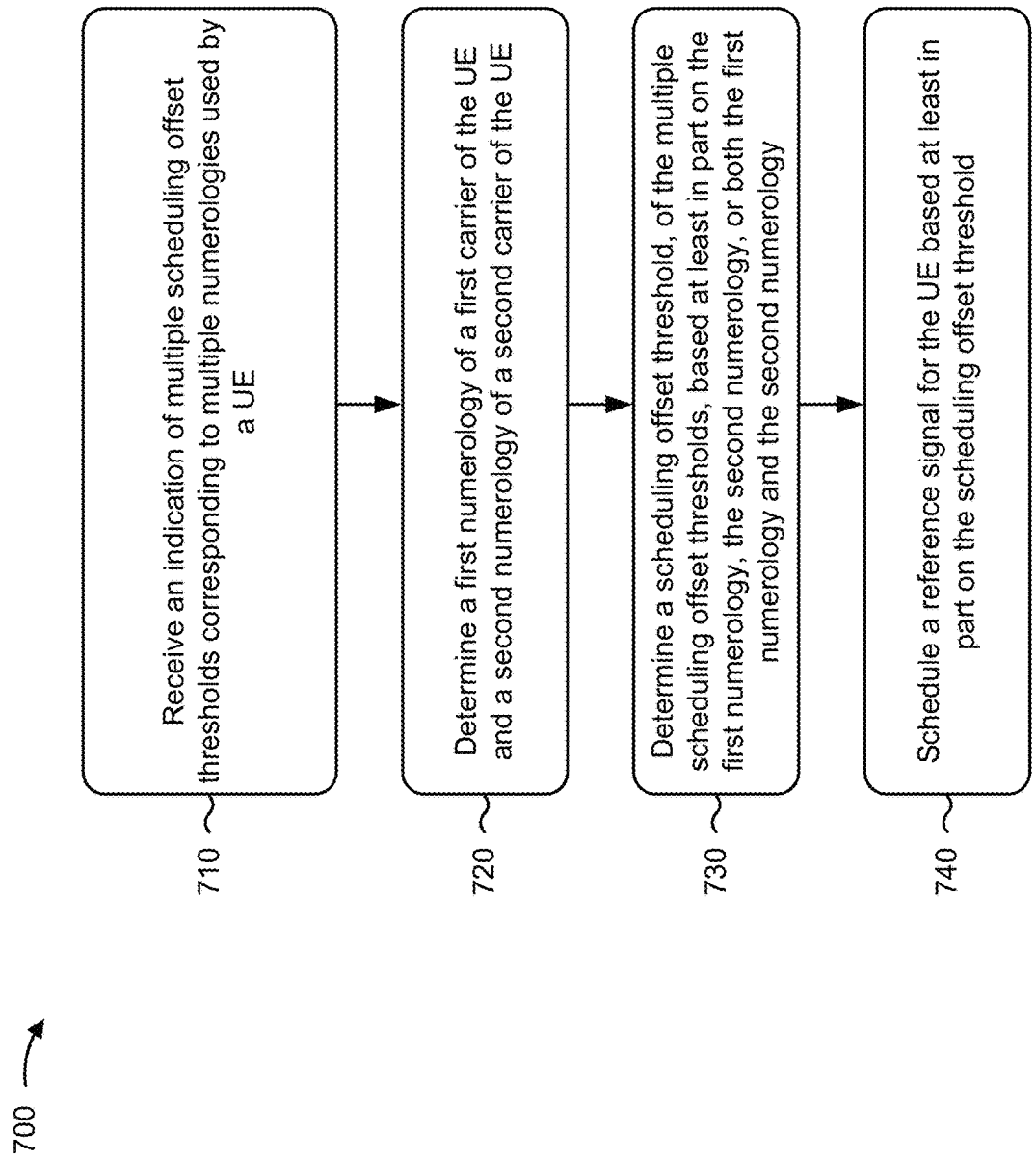

FIG. 7 is a diagram illustrating an example process 700 performed, for example, by a base station, in accordance with various aspects of the present disclosure. Example process 700 is an example where a base station (e.g., base station 110 and/or the like) performs operations associated with determining a scheduling offset or a scheduling offset threshold for a reference signal in a cross-carrier scheduling scenario.

As shown in FIG. 7, in some aspects, process 700 may include receiving an indication of multiple scheduling offset thresholds corresponding to multiple numerologies used by a user equipment (UE) (block 710). For example, the base station (e.g., using antenna 234, DEMOD 232, MIMO detector 236, receive processor 238, controller/processor 240, and/or the like) may receive an indication of multiple scheduling offset thresholds corresponding to multiple numerologies used by a UE, as described above in connection with FIG. 5. In some aspects, each scheduling offset threshold indicates, for a corresponding numerology, a minimum number of symbols between DCI and a reference signal scheduled by the DCI.

As further shown in FIG. 7, in some aspects, process 700 may include determining a first numerology of a first carrier of the UE and a second numerology of a second carrier of the UE (block 720). For example, the base station (e.g., using controller/processor 240 and/or the like) may determine a first numerology of a first carrier of the UE and a second numerology of a second carrier of the UE, as described above in connection with FIG. 5.

As further shown in FIG. 7, in some aspects, process 700 may include determining a scheduling offset threshold, of the multiple scheduling offset thresholds, based at least in part on the first numerology, the second numerology, or both the first numerology and the second numerology (block 730). For example, the base station (e.g., using controller/processor 240 and/or the like) may determine a scheduling offset threshold, of the multiple scheduling offset thresholds, based at least in part on the first numerology, the second numerology, or both the first numerology and the second numerology, as described above in connection with FIG. 5.

As further shown in FIG. 7, in some aspects, process 700 may include scheduling a reference signal for the UE based at least in part on the scheduling offset threshold (block 740). For example, the base station (e.g., using controller/processor 240, transmit processor 220, TX MIMO processor 230, MOD 232, antenna 234, and/or the like) may schedule a reference signal for the UE based at least in part on the scheduling offset threshold, as described above in connection with FIG. 5.

Process 700 may include additional aspects, such as any single aspect or any combination of aspects described below and/or in connection with one or more other processes described elsewhere herein.

Various types of reference signals and offset thresholds can be used for various embodiments for an array of deployment options. In some aspects, the minimum duration is expressed as a number of symbols. In some aspects, the minimum duration is expressed as a number of slots. In some aspects, the reference signal scheduled for the UE is an aperiodic channel state information reference signal (A-CSI-RS). In some aspects, the scheduling offset threshold corresponds to the first numerology. In some aspects, the scheduling offset threshold corresponds to the second numerology. In some aspects, the scheduling offset threshold corresponds to a numerology determined as a function of the first numerology and the second numerology. In some aspects, the scheduling offset threshold corresponds to a minimum numerology of the first numerology and the second numerology. In some aspects, the scheduling offset threshold corresponds to a maximum numerology of the first numerology and the second numerology.

In some aspects, the first numerology and the second numerology are different. In some aspects, the indication of the multiple scheduling offset thresholds is received in a UE capability report. In some aspects, the multiple scheduling offset thresholds include different scheduling offset threshold values for each numerology of the multiple numerologies.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a UE, in accordance with various aspects of the present disclosure. Example process 800 is an example where a UE (e.g., UE 120 and/or the like) performs operations associated with determining a scheduling offset or a scheduling offset threshold for a reference signal in a cross-carrier scheduling scenario.

As shown in FIG. 8, in some aspects, process 800 may include receiving, via a first carrier, an indication of an offset for scheduling a reference signal on a second carrier (block 810). For example, the UE (e.g., using antenna 252, DEMOD 254, MIMO detector 256, receive processor 258, controller/processor 280, and/or the like) may receive, via a first carrier, an indication of an offset for scheduling a reference signal on a second carrier, as described above in connection with FIG. 6. In some aspects, the offset indicates a duration (e.g., a number of slots, a number of symbols, a number of TTIs, and/or the like) between DCI, that schedules the reference signal, and the reference signal.

As further shown in FIG. 8, in some aspects, process 800 may include determining a first numerology of the first carrier and a second numerology of the second carrier (block 820). For example, the UE (e.g., using controller/processor 280 and/or the like) may determine a first numerology of the first carrier and a second numerology of the second carrier, as described above in connection with FIG. 6.

As further shown in FIG. 8, in some aspects, process 800 may include determining a time offset for the reference signal based at least in part on the offset and at least one of the first numerology, the second numerology, or both the first numerology and the second numerology (block 830). For example, the UE (e.g., using controller/processor 280 and/or the like) may determine a time offset for the reference signal based at least in part on the offset and at least one of the first numerology, the second numerology, or both the first numerology and the second numerology, as described above in connection with FIG. 6.

Process 800 may include additional aspects, such as any single aspect or any combination of aspects described below and/or in connection with one or more other processes described elsewhere herein.

In some aspects, the duration is expressed as a number of symbols. In some aspects, the duration is expressed as a number of slots. In some aspects, the reference signal includes at least one of an aperiodic channel state information reference signal (A-CSI-RS) or a sounding reference signal (SRS). In some aspects, the time offset is determined using the first numerology. In some aspects, the time offset is determined using the second numerology. In some aspects, the time offset is determined as a function of the first numerology and the second numerology. In some aspects, the time offset is determined using a minimum numerology of the first numerology and the second numerology. In some aspects, the time offset is determined using a maximum numerology of the first numerology and the second numerology.

In some aspects, the first numerology and the second numerology are different. In some aspects, the time offset is a slot offset or a symbol offset. In some aspects, process 800 includes transmitting or receiving the reference signal based at least in part on the time offset. In some aspects, the offset is based at least in part on at least one of a first scheduling offset threshold, corresponding to the first numerology, or a second scheduling offset threshold corresponding to the second numerology.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by an apparatus, comprising:
   receiving, from a user equipment (UE), an indication of multiple scheduling offset thresholds corresponding to multiple numerologies, wherein each scheduling offset threshold of the multiple scheduling offset thresholds indicates, for a corresponding numerology, a minimum duration for the UE to switch to a different beam between downlink control information (DCI) and a reference signal associated with the DCI, wherein the DCI and the reference signal have different numerologies; and
   scheduling a particular reference signal, with a scheduled offset between a particular DCI and the particular reference signal, for the UE based at least in part on a particular scheduling offset threshold of the multiple scheduling offset thresholds.

2. The method of claim 1, wherein the minimum duration is a number of symbols.

3. The method of claim 1, wherein the scheduling offset threshold is based at least in part on a function of a first numerology associated with the DCI and a second numerology associated with the reference signal.

4. The method of claim 1, wherein the particular reference signal is scheduled based at least in part on whether the scheduled offset satisfies the scheduling offset threshold.

5. The method of claim 4, wherein, if the scheduled offset is greater than the scheduling offset threshold, the particular DCI indicates a beam for transmission of the particular reference signal.

6. The method of claim 4, wherein, if the scheduled offset is less than the scheduling offset threshold, a default beam for the particular reference signal is used.

7. The method of claim 1, wherein the reference signal is an aperiodic channel state information reference signal.

8. An apparatus for wireless communication, comprising:
   a memory; and
   one or more processors coupled to the memory, wherein the one or more processors are configured to:
   receive, from a user equipment (UE), an indication of multiple scheduling offset thresholds corresponding to multiple numerologies, wherein each scheduling offset threshold of the multiple scheduling offset thresholds indicates, for a corresponding numerology, a minimum duration for the UE to switch to a different beam between downlink control information (DCI) and a reference signal associated with the DCI, wherein the DCI and the reference signal have different numerologies; and
   schedule a particular reference signal, with a scheduled offset between a particular DCI and the particular reference signal, for the UE based at least in part on a particular scheduling offset threshold of the multiple scheduling offset thresholds.

9. The apparatus of claim 8, wherein the minimum duration is a number of symbols.

10. The apparatus of claim 8, wherein the scheduling offset threshold is based at least in part on a function of a first numerology associated with the DCI and a second numerology associated with the reference signal.

11. The apparatus of claim 8, wherein the particular reference signal is scheduled based at least in part on whether the scheduled offset satisfies the scheduling offset threshold.

12. The apparatus of claim 11, wherein, if the scheduled offset is greater than the scheduling offset threshold, the particular DCI indicates a beam for transmission of the particular reference signal.

13. The apparatus of claim 11, wherein, if the scheduled offset is less than the scheduling offset threshold, a default beam for the particular reference signal is used.

14. The apparatus of claim 8, wherein the reference signal is an aperiodic channel state information reference signal.

15. An apparatus for wireless communication, comprising:
   a memory; and
   one or more processors coupled to the memory, wherein the one or more processors are configured to:
   receive, from a user equipment (UE), an indication of multiple scheduling offset thresholds corresponding to multiple numerologies, wherein each scheduling offset threshold of the multiple scheduling offset thresholds indicates, for a corresponding numerology, a minimum duration for the UE to switch to a different beam; and
   schedule a reference signal, with a scheduled offset between downlink control information (DCI) and the reference signal, for the UE based at least in part on a particular scheduling offset threshold of the multiple scheduling offset thresholds.

16. The apparatus of claim 15, wherein the minimum duration is a number of symbols.

17. The apparatus of claim 15, wherein the scheduling offset threshold is based at least in part on a function of a first numerology associated with the DCI and a second numerology associated with the reference signal.

18. The apparatus of claim 15, wherein the reference signal is scheduled based at least in part on whether the scheduled offset satisfies the scheduling offset threshold.

19. The apparatus of claim 15, wherein the reference signal is an aperiodic channel state information reference signal.

20. An apparatus for wireless communication, comprising:
a memory; and
one or more processors coupled to the memory, wherein the one or more processors are configured to:
receive, from a user equipment (UE), an indication of multiple scheduling offset thresholds corresponding to multiple numerologies, wherein each scheduling offset threshold of the multiple scheduling offset thresholds indicates, for a corresponding numerology, a minimum duration for the UE to switch to a different beam between downlink control information (DCI) and a reference signal associated with the DCI, wherein the DCI and the reference signal have different numerologies; and
transmit a particular reference signal, with a scheduled offset between a particular DCI and the particular reference signal, for the UE based at least in part on a particular scheduling offset threshold of the multiple scheduling offset thresholds.

21. The apparatus of claim 20, wherein the minimum duration is a number of symbols.

22. The apparatus of claim 20, wherein the scheduling offset threshold is based at least in part on a function of a first numerology associated with the DCI and a second numerology associated with the reference signal.

23. The apparatus of claim 20, wherein the particular reference signal is scheduled based at least in part on whether the scheduled offset satisfies the scheduling offset threshold.

24. The apparatus of claim 20, wherein the reference signal is an aperiodic channel state information reference signal.

25. The apparatus of claim 18, wherein, if the scheduled offset is greater than the scheduling offset threshold, the DCI indicates a beam for transmission of the reference signal.

26. The apparatus of claim 18, wherein, if the scheduled offset is less than the scheduling offset threshold, a default beam for the reference signal is used.

27. The apparatus of claim 23, wherein, if the scheduled offset is greater than the scheduling offset threshold, the particular DCI indicates a beam for transmission of the particular reference signal.

28. The apparatus of claim 23, wherein, if the scheduled offset is less than the scheduling offset threshold, a default beam for the particular reference signal is used.

29. The method of claim 1, wherein the particular scheduling offset threshold corresponds to a numerology of the particular reference signal.

30. The method of claim 29, wherein the multiple numerologies include the numerology of the particular reference signal.

31. The method of claim 30, wherein the minimum duration is a number of symbols, and wherein the reference signal is an aperiodic channel state information reference signal.

32. The apparatus of claim 8, wherein the particular scheduling offset threshold corresponds to a numerology of the particular reference signal.

33. The apparatus of claim 32, wherein the multiple numerologies include the numerology of the particular reference signal.

34. The apparatus of claim 33, wherein the minimum duration is a number of symbols, and wherein the reference signal is an aperiodic channel state information reference signal.

35. The apparatus of claim 15, wherein the particular scheduling offset threshold corresponds to a numerology of the reference signal.

36. The apparatus of claim 35, wherein the multiple numerologies include the numerology of the reference signal.

37. The apparatus of claim 36, wherein the minimum duration is a number of symbols, and wherein the reference signal is an aperiodic channel state information reference signal.

38. The apparatus of claim 20, wherein the particular scheduling offset threshold corresponds to a numerology of the particular reference signal.

39. The apparatus of claim 38, wherein the multiple numerologies include the numerology of the particular reference signal.

40. The apparatus of claim 39, wherein the minimum duration is a number of symbols, and wherein the reference signal is an aperiodic channel state information reference signal.

41. An apparatus for wireless communication, comprising:
a memory; and
one or more processors coupled to the memory, wherein the one or more processors are configured to:
receive, from a user equipment (UE), an indication of multiple scheduling offset thresholds corresponding to multiple numerologies, wherein each scheduling offset threshold of the multiple scheduling offset thresholds, for a corresponding numerology, is associated with a minimum duration for the UE to switch to a different beam between downlink control information (DCI) and a reference signal associated with the DCI, wherein the DCI and the reference signal have different numerologies; and
schedule a particular reference signal, with a scheduled offset between a particular DCI and the particular reference signal, for the UE based at least in part on a particular scheduling offset threshold of the multiple scheduling offset thresholds.

42. The apparatus of claim 41, wherein the particular scheduling offset threshold corresponds to a numerology of the particular reference signal.

43. The apparatus of claim 42, wherein the multiple numerologies include the numerology of the particular reference signal.

44. The apparatus of claim 43, wherein the minimum duration is a number of symbols, and wherein the reference signal is an aperiodic channel state information reference signal.

45. An apparatus for wireless communication, comprising:
a memory; and one or more processors coupled to the memory, wherein the one or more processors are configured to:
receive, from a user equipment (UE), an indication of multiple scheduling offset thresholds corresponding to multiple numerologies, wherein each scheduling offset threshold of the multiple scheduling offset thresholds, for a corresponding numerology, is associated with a minimum duration for the UE to switch to a different beam; and
schedule a reference signal, with a scheduled offset between downlink control information (DCI) and the reference signal, for the UE based at least in part on a particular scheduling offset threshold of the multiple scheduling offset thresholds.

46. The apparatus of claim 45, wherein the particular scheduling offset threshold corresponds to a numerology of the reference signal.

47. The apparatus of claim 46, wherein the multiple numerologies include the numerology of the reference signal.

48. The apparatus of claim 47, wherein the minimum duration is a number of symbols, and wherein the reference signal is an aperiodic channel state information reference signal.

49. An apparatus for wireless communication, comprising:
a memory; and
one or more processors coupled to the memory, wherein the one or more processors are configured to:
receive, from a user equipment (UE), an indication of multiple scheduling offset thresholds corresponding to multiple numerologies, wherein each scheduling offset threshold of the multiple scheduling offset thresholds, for a corresponding numerology, is associated with a minimum duration for the UE to switch to a different beam between downlink control information (DCI) and a reference signal associated with the DCI, wherein the DCI and the reference signal have different numerologies; and
transmit a particular reference signal, with a scheduled offset between a particular DCI and the particular reference signal, for the UE based at least in part on a particular scheduling offset threshold of the multiple scheduling offset thresholds.

50. The apparatus of claim 49, wherein the particular scheduling offset threshold corresponds to a numerology of the particular reference signal.

51. The apparatus of claim 50, wherein the multiple numerologies include the numerology of the particular reference signal.

52. The apparatus of claim 51, wherein the minimum duration is a number of symbols, and wherein the reference signal is an aperiodic channel state information reference signal.

53. An apparatus for wireless communication, comprising:
a memory; and
one or more processors coupled to the memory, wherein the one or more processors are configured to:
receive, from a user equipment (UE), an indication of multiple scheduling offset thresholds corresponding to multiple numerologies, wherein:
each scheduling offset threshold of the multiple scheduling offset thresholds, for a corresponding numerology, is associated with a minimum duration for the UE to switch to a different beam between downlink control information (DCI) and a reference signal associated with the DCI;
the DCI and the reference signal have different numerologies;
the minimum duration is a number of symbols; and
the reference signal is an aperiodic channel state information reference signal; and
schedule a particular reference signal, with a scheduled offset between a particular DCI and the particular reference signal, for the UE based at least in part on a particular scheduling offset threshold of the multiple scheduling offset thresholds, wherein:
the particular scheduling offset threshold corresponds to a numerology of the particular reference signal, and
the multiple numerologies include the numerology of the particular reference signal.

* * * * *